No. 756,228. PATENTED APR. 5, 1904.
I. FOX.
EYEGLASSES.
APPLICATION FILED JULY 30, 1903.
NO MODEL.
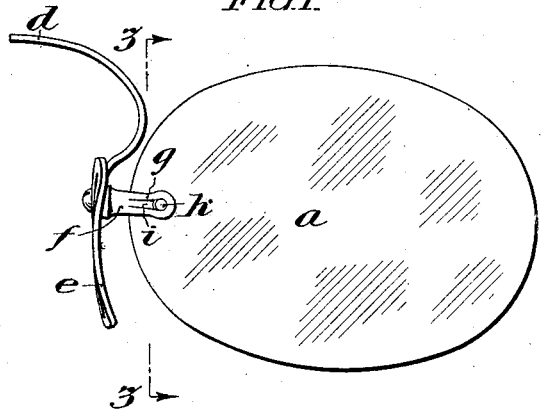
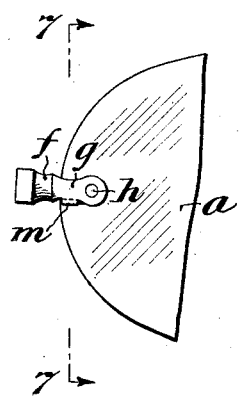
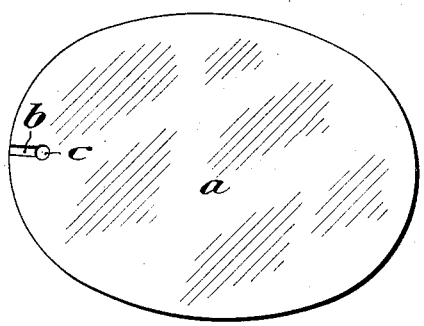
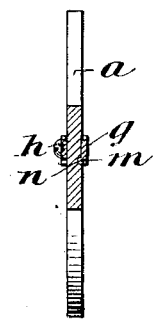
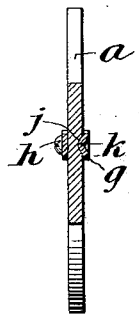
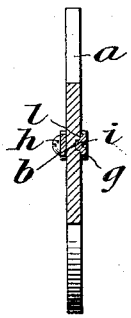
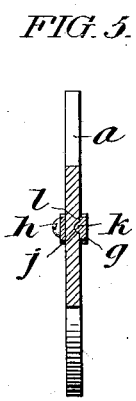
WITNESSES:
INVENTOR:
Ivan Fox
By his Attorney
Wm C Strawbridge No. 756,228. Patented April 5, 1904.

UNITED STATES PATENT OFFICE.

IVAN FOX, OF LANSDOWNE, PENNSYLVANIA.

EYEGLASSES.

SPECIFICATION forming part of Letters Patent No. 756,228, dated April 5, 1904.

Application filed July 30, 1903. Serial No. 167,550. (No model.)

*To all whom it may concern:*

Be it known that I, IVAN FOX, a citizen of the United States, residing at Lansdowne, in the county of Delaware and State of Pennsylvania, have invented certain new and useful Improvements in Eyeglasses, of which the following is a specification.

This invention relates to an improvement in eye glasses, and it has for its object to provide means for securing the straps of an eye glass frame to the lenses of a pair of eye glasses so as to prevent the said straps and their attached devices from becoming loose upon the lenses.

As heretofore constructed, the straps have been provided with stays extending laterally therefrom in the plane of the lenses, the stays being in contact with the edge of the lenses upon opposite sides of the straps, the object of the stays being to prevent relative movement between the straps and the eye glass lenses.

It has been found, however, that in use the stays become slightly bent outwardly, that is, away from the edge of the lenses, and therefore permit the movement of the lenses relatively to the straps, which they were intended to prevent. And, furthermore, the stays exert spring pressure against the edges of the lenses and through the straps the said stays exert a constant pull upon the screws, by means of which the straps are secured to the lenses so that the lenses are often chipped and destroyed.

The object of my invention is to dispense with the stays referred to, and at the same time secure the straps and their attached devices firmly and stationarily to the lenses so that they will not become loosened and also at the same time obviate the breakage of the lenses referred to.

My invention is illustrated as applied to rimless nose glasses, and it consists in the construction and arrangement of the parts as hereinafter described in detail, and set forth specifically in the claims, and as illustrated in the accompanying drawings, in which, Figure 1 is a rear elevation of a lens and a portion of an eye glass frame secured thereto, showing my invention;

Figure 2 is a rear elevation of a lens provided with a groove in the inner portion of its surface and constituting a part of my invention;

Figure 3 is a section taken on the line 3-3 of Figure 1;

Figure 4 is a corresponding section showing a slight modification;

Figure 5 is also a corresponding section showing a second modified construction;

Figure 6 is a rear elevation of a portion of an eye glass lens having a post or standard secured thereto, and disclosing still another modified construction; and Figure 7 is a section thereof along the line 7-7.

In the drawings, $a$ designates a lens of a pair of eye glasses, the rear surface of which is provided with a groove or depression $b$, extending between the screw hole $c$ and the inner edge of the lens, that is, the edge nearest the nose, as clearly indicated in Figure 2. $d$ designates a bow spring of an eye glass frame; and $e$ designates a nose guard or clip. Both the bow spring and the guard are secured to the post or standard $f$ in the usual manner.

Secured to the post or standard $f$ is a U-shaped strap $g$ which is adapted to fit over the edge of the lens in the usual manner. The strap is secured to the lens by means of a screw $h$ passing through the screw hole $c$ as is usual. Formed upon the inner side of the rear leg of the U-shaped strap is an elongated ridge or projection $i$, formed in any convenient manner, as by means of a suitable die, the said projection being adapted to engage the groove $b$ in the surface of the lens.

As illustrated in Figures 2 and 3, the groove $b$ in the lens is substantially rectangular in transverse section. The ridge or projection, however, formed upon the inner side of the leg or limb of the strap is slightly rounded, the opposite sides thereof being adapted to engage the opposite edges of the groove or depression $b$, as is clearly illustrated in Figure 3 of the drawings.

In Figure 4, I have illustrated a slightly modified construction in which a transverse section of the groove $j$ in the lens is in the form of a segment of a circle, and the ridge or projection $k$ upon the strap is of the same contour, and the said projection is adapted to engage and fit closely the groove in the lens.

Figure 5 illustrates a second slightly modified construction in which the groove *j* in the lens and in which the ridge or projection *k* upon the strap are substantially the same as illustrated in Figure 4. As illustrated in Figure 5, however, the outer surface is plain, that is, formed without the depression shown in Figures 1, 3 and 4.

The flat or plain portions 1 of the strap, upon opposite sides of the ridges or projections *i* and *k* of Figures 3 and 5, previously referred to, contact with the surface of the eye glass lens upon opposite sides of the grooves *b* and *j* and tend to the rigidity of the construction.

In Figures 6 and 7 I have shown still another modification of the construction in which the projection *m* is formed upon one side of a leg of the post or standard strap *g*. The said projection is adapted to engage a slot *n* similar to the slots previously referred to.

The salient feature of this invention consists in providing a groove in either the front or rear surface of the lens (preferably the rear), between the screw hole through which a screw is passed to secure a stap to the lens and the inner edge of the said lens, and in providing a ridge or projection upon the strap which is adapted to engage the said groove.

If the strap happens to be of U-shape as illustrated, a ridge or projection may be provided on the inner side of both the legs of the strap, in which case a groove should be formed upon each side of the lens for the reception of the projections. The groove in the lens and also the ridge or projection upon the strap may be formed in any convenient or suitable manner, and may be of any desired dimensions and shape. While the ridge or projection in Figures 1 to 5, inclusive, is shown as continuous, that is elongated, it is obvious that a plurality of disconnected projections may be substituted for the continuous projection illustrated, and that such construction would embody the advantages of my invention.

In the drawings a U-shaped strap is shown, but it is obvious that my invention is applicable to a construction in which the strap is not of U-shape, but extends out upon but one side only of the lens.

While my invention is illustrated as applied to rimless nose glasses, having posts or standards, which are secured to the straps, it is obvious that it may be applied to the straps of rimless spectacles.

Broadly stated, the invention may be employed in the construction of eye glass frames whenever it is desired to secure a strap to an eye glass lens.

Having thus described my invention, I claim—

1. As an article of manufacture, a post or standard for eye glasses provided with a strap, the said strap having a leg which is curvilinear in transverse section.

2. As an article of manufacture, a post or standard for eye glass frames provided with a strap, the said strap having a leg which is concavo-convex in transverse section.

3. The combination of an eye glass lens having a perforation located at a distance from its end and having a groove formed in its surface and extending from said perforation to its edge, with a strap having a projection extending longitudinally thereof, the said projection being adapted to engage the said groove, and a securing device passing through the said perforation and through the said strap to secure the latter to the lens.

4. The combination of an eye glass lens having a depression in the surface thereof, with a strap having a projection adapted to engage said depression, and a securing device passing through the lens at a point removed from its edge, the said device also passing through the said strap to secure it to the lens.

5. The combination of an eye glass lens having a depression in the surface thereof, with a strap which is adapted to fit into and engage the sides of said depression, and a securing device passed through the lens at a point removed from its edge, the said device also passing through the said strap to secure it to the lens.

In testimony that I claim the foregoing as my invention I have hereunto signed my name this 29th day of July, A. D. 1903.

IVAN FOX.

In presence of—
CYRUS N. ANDERSON,
LAURA KLEINFELDER.